United States Patent [19]

Legris

[11] 4,432,385

[45] Feb. 21, 1984

[54] DEVICES FOR REGULATING THE FLOW AND THE PRESSURE OF GASEOUS FLUIDS

[75] Inventor: Andre Legris, Saint Maur, France

[73] Assignee: Legris S/A, Rennes, France

[21] Appl. No.: 254,619

[22] Filed: Apr. 16, 1981

[30] Foreign Application Priority Data

Apr. 23, 1980 [FR] France ............................... 80 09143

[51] Int. Cl.[3] ............................................. F16K 17/18

[52] U.S. Cl. ...................................... 137/271; 91/443; 137/493.3; 137/556; 137/599.2

[58] Field of Search ............... 137/493.1, 493.2, 493.3, 137/493.4, 493.5, 271, 556, 599, 599.2; 91/443

[56] References Cited

U.S. PATENT DOCUMENTS

| | | | |
|---|---|---|---|
| 2,634,947 | 4/1953 | Gardner | 137/493.2 |
| 3,032,063 | 5/1962 | Wells | 137/599.2 |
| 3,581,762 | 6/1971 | Bracki | 91/443 X |
| 4,122,863 | 10/1978 | Braukmann | 137/557 |
| 4,147,179 | 4/1979 | Miura | 137/599 |
| 4,182,360 | 1/1980 | Neff | 137/270 |
| 4,195,552 | 4/1980 | Neff | 91/443 |

FOREIGN PATENT DOCUMENTS

| | | | |
|---|---|---|---|
| 1241675 | 8/1962 | Fed. Rep. of Germany . | |
| 1156811 | 7/1969 | United Kingdom . | |
| 1285733 | 8/1972 | United Kingdom | 137/493.3 |
| 2018954 | 10/1979 | United Kingdom . | |

OTHER PUBLICATIONS

Machine Design, vol. 31, No. 10, p. 166, May 1959.

*Primary Examiner*—Robert G. Nilson
*Attorney, Agent, or Firm*—Shenier & O'Connor

[57] ABSTRACT

The present invention concerns an improvement to devices for regulating the flow and the pressure of compressed gases in order to save energy.

The device according to the invention comprises a main body whose inlet nozzle is connected to a main seat on which a main valve is adapted to come to rest, said main valve being integral with a valve-chamber and being returned to its seat by means of an elastic member, a secondary valve being adapted to occupy an opening position to allow the flow of gas from the pressure user apparatus whose rate of flow is controlled by a nozzle provided in the main valve.

The invention finds an application in the control of jacks.

25 Claims, 11 Drawing Figures

Fig 1
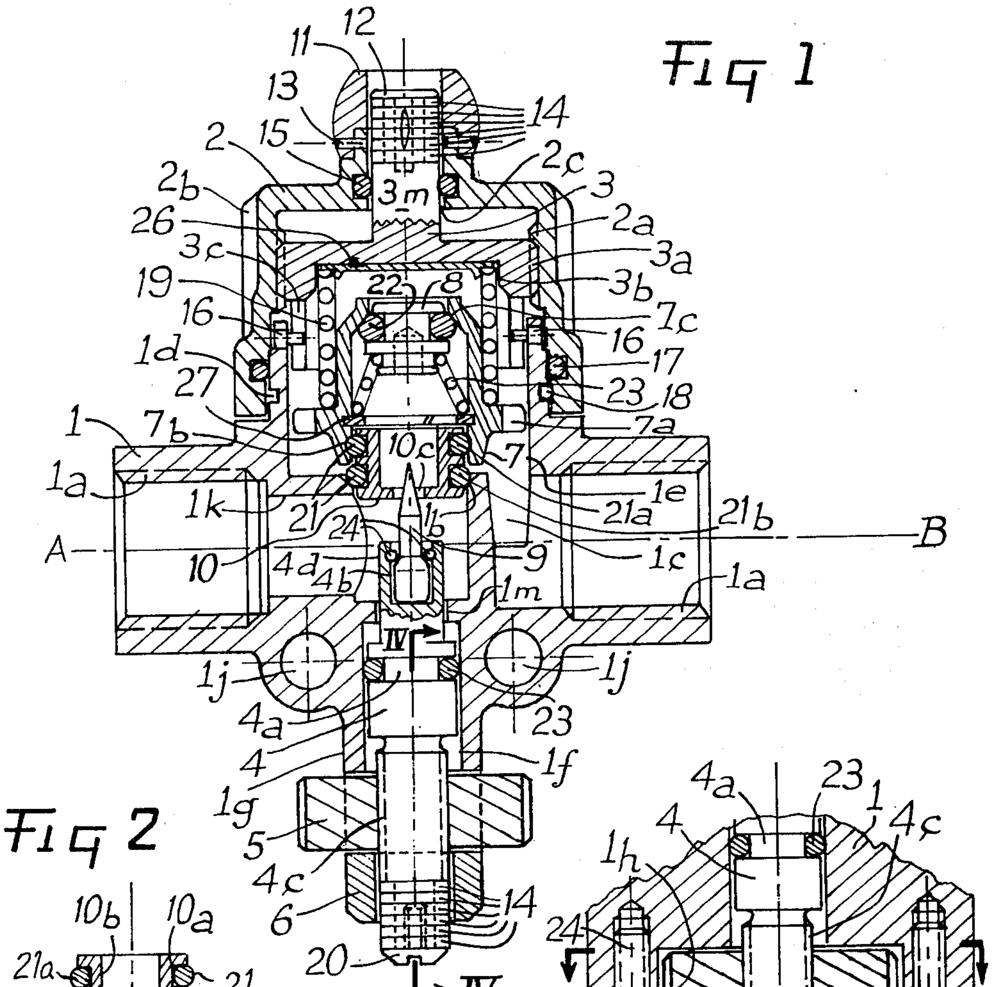
Fig 2
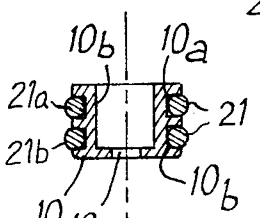
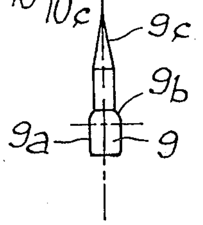
Fig 3
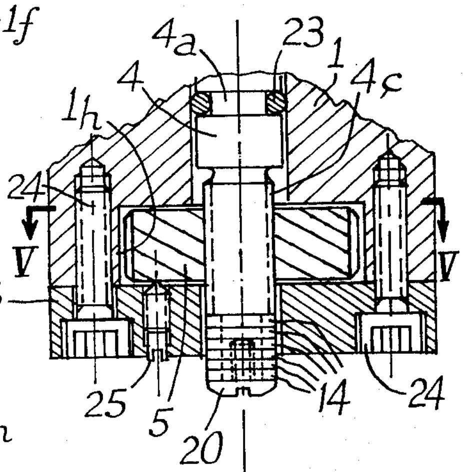
Fig. 4
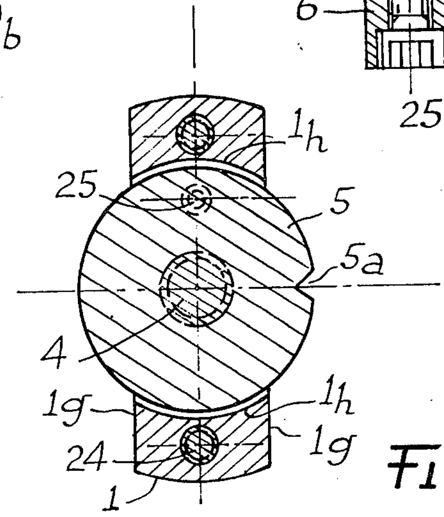
Fig. 5

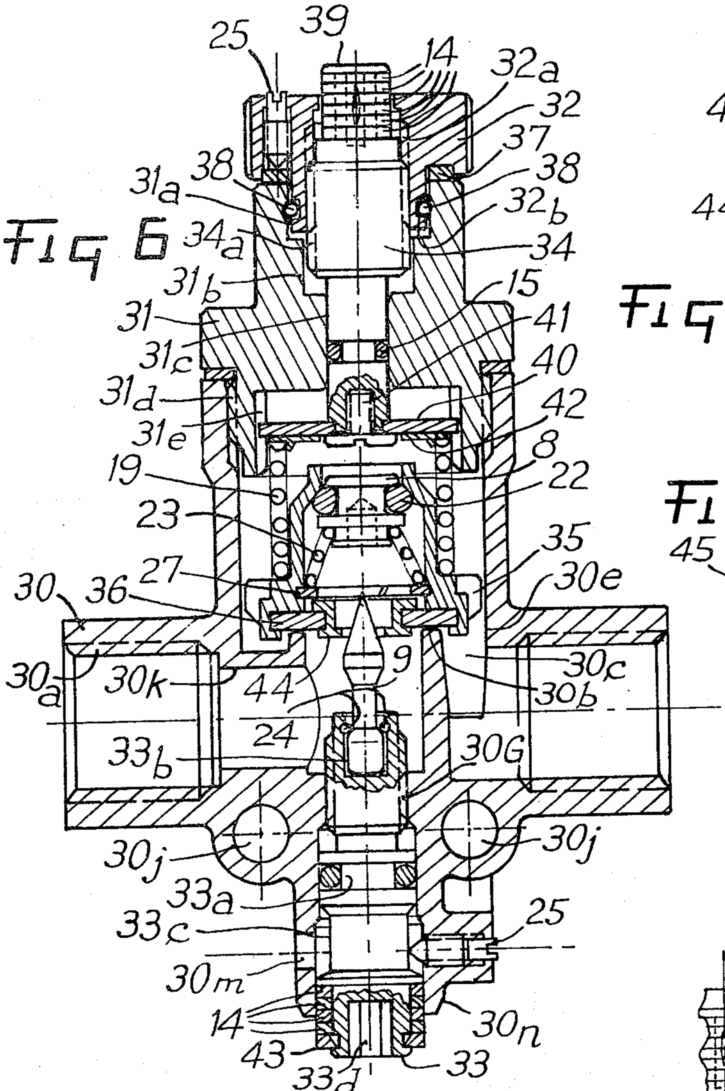
Fig 6
Fig.7
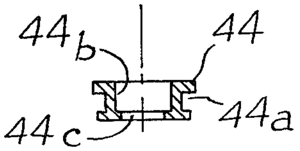
Fig 8
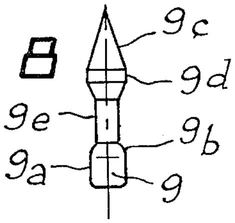
Fig.9
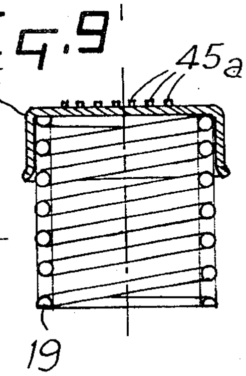
Fig.10
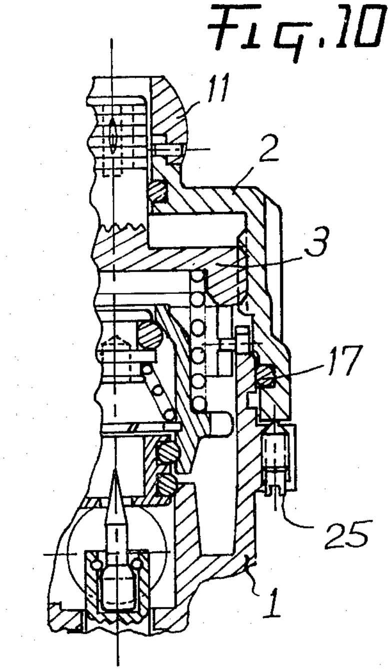
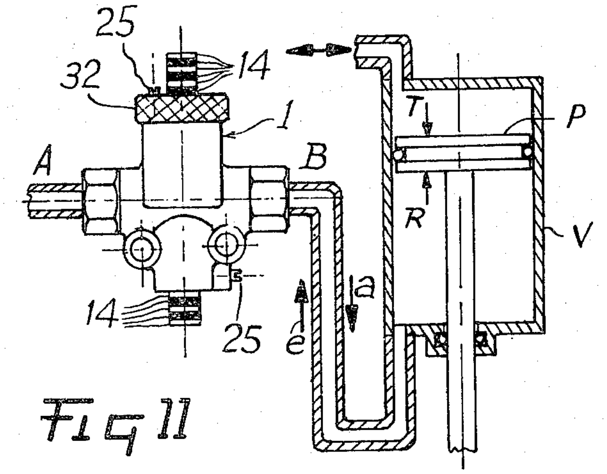
Fig 11

DEVICES FOR REGULATING THE FLOW AND THE PRESSURE OF GASEOUS FLUIDS

The present invention relates to an improvement to devices designed to regulate the flow and the pressure of gaseous fluids. Much research has been devoted to regulating the flow and the pressure of gaseous fluids in general and of compressed air in particular, and apparatus are known for regulating the pressure in which the expansion of the gases is obtained by means of valves subjected to the action of springs with or without servo-control by way of membranes. It is also known to use gas flow regulating devices which operate by a constriction of the gas flow according to different methods. The flow regulating devices are often combined with a non-return valve which is biased and allows a total and rapid flow of the gas in one direction and a low rate of flow in the other direction.

Other devices are known in which means for regulating the gas pressure in one direction are associated to means for regulating the flow in the other direction.

This combination of complex functions is described in U.S. Pat. No. 4,182,360.

However, these devices do not always permit, and this is the case with the aforesaid document, to pre-regulate the functions separately, when the installation is not in service, and with a visual indication of the adjustments effected (visualization provided for and recorded on the machine adjustment chart). Now, pre-regulating has become necessary and consequently the visualization must be perfect and reliable in order to proceed with the adjustments. It is inconceivable to create machine-cycles, because of the risk, especially to regulate the speed of a jack by acting progressively on a flow regulator. Certain regulators however are graduated like a micrometer gauge and, in this case, pre-regulating is possible. Nonetheless, the marked indications can only be seen from very close to, and this can be a handicap when the access is not very good because of lack of space due to the control means being too close together.

It is the object of the present invention to overcome these drawbacks and also to obtain a saving in compressed gas, which corresponds to a saving in energy, this having become an absolute necessity in these times of ever-increasing costs of energy. There is at the moment, enormous amounts of energy wasted in the use of gases at the industrial level, and especially in the use of compressed air, when the gas is used at a higher pressure than is really necessary. The return of compressed air jacks uses the same fluid system as the working stroke so that the jack is filled with compressed gas at a working pressure, for its return stroke, although it returns without any particularly important effort. A pressure two or three times reduced would be suitable to return the jack, this corresponding to a volume of air two to three times smaller.

Consequently, if all the pneumatic jacks were supplid at low pressure on their return motion, this would lead to an important saving in energy due to the use of less powerful compressors. Each use however needs to be adapted and regulated in optimum manner with an appropriate return speed for the jack and a maximum of air saved, and thus of energy saved. It would then be necessary to equip all the return circuits of jacks with relief-valves and with very special by-passes for the other direction. This arrangement would of course be very expensive on account of the high cost of relief-valves which, in addition, are often very fragile.

The object of the invention is an improvement in flow and pressure regulating devices giving a perfect and simple possibility of saving energy in the form of compressed gases, and of optimizing these savings.

The device according to the invention comprises a main body provided with aligned inlet and outlet nozzles, the inlet nozzle being connected to a main seat on which can come to rest a main valve integral with a valve-chamber and returned to its position on the seat by an elastic member whose tension is controlled by a manual adjustment comprising a visual indicator means which extend in variable manner on the outside of the hand-setting means, the main valve ensuring by lamination of the gas a reduction of the pressure in the direction of the pressure-user apparatus, the said valve-chamber comprising at its other end a secondary valve returned by means of a one-way acting weak elastic member, so that, when the first valve is in the closing off position, the secondary valve is adapted to occupy an opening position for the passage of the gas flowing in from the pressure-user apparatus, whose rate of flow is controlled by a nozzle provided in the main valve and whose section is closed off selectively by a needle-valve whose position is controlled by a hand-operated control means comprising a visual indicator extending in variable manner on the outside of the device, the said visual indicators comprising markings which correspond to the position of the regulating members and to the value of the flow and of the pressure.

The device according to the invention is compact and is mounted on the pipe supplying the return side of an air-jack, the said device having two different functions, separately adjustable, the adjustments being displayed in especially noticeable manner even from a great distance.

One of its functions ensures the limitation of the pressure of the volume of air acting on the return side of the jack. This function being that of energy-saving pressure regulator. The other function is to regulate the flow and is integrated to the apparatus, it permits during the working stroke of the jack to control its forward speed by slowing down the purged air on the return side.

The device according to the invention can also be used on the working side of the jack but only in the case of overdimensioned jacks.

The original character of the invention does not reside in the association of these functions which can be obtained in different ways, but rather in the disposition of the means which, under a compact and original form, re-groups all the means necessary, permits pre-adjustments of the machine when the latter is not in service, due to a practical and clear visual indicator, and because of a simple system allowing for the same apparatus several ranges of responsiveness, for the energy saving pressure regulator as well as for the flow regulator.

The change of responsiveness thus permits a different functioning for the same apparatus according to the invention with a whole range of jacks of different dimensions.

The invention will be more readily understood on reading the following description with reference to the accompanying drawings in which:

FIG. 1 is an elevational view of an axial cross-section of an embodiment of the regulator device according to the invention in the rest position;

FIG. 2 is an axial cross-section of the main valve;

FIG. 3 is an elevational view of the flow-regulating needle-valve;

FIG. 4 is an axial cross-section along IV—IV of FIG. 1 of a detail showing the regulating of the flow.

FIG. 5 is a radial cross-section along V—V of FIG. 4 of the milled knob used for regulating the flow.

FIG. 6 is an elevational view of an axial cross-section of another embodiment of the regulator device according to the invention.

FIG. 7 is an axial cross-section of the main valve shown in FIG. 6;

FIG. 8 is an elevational view of the needle-valve shown in FIG. 6;

FIG. 9 is a cross-sectional view of the spring acting on the main valve of the pressure regulator and on which is mounted a plastic colored cap (characteristic of responsiveness).

FIG. 10 is a partial cross-section along the control axis, showing the locking screw for the operating wheel of the energy-saving pressure regulator.

FIG. 11 is a diagram of the connection of the device according to the invention on the return side of an air jack.

FIG. 1 illustrates an embodiment of the regulator device according to the invention, which device comprises a body 1 provided with two fluid inlet and outlet nozzles 1*a* provided with an internal thread, and aligned together. The inlet nozzle situated on the side A is extended by a gas passage 1*k* which issues through an orifice defined by a central seat 1*b* into a passage 1*c* which is shaped as a port and leads to the nozzle 1*a* on the outlet side B.

The body receives at its upper part the energy-saving pressure regulating means and at its lower part the flow regulating means. Said body further comprises two securing holes 1*j* permitting to secure it by means of bolts if necessary.

The energy-saving pressure regulator means is constituted by a main valve 10 adapted to come into resting contact on the seat 1*b* whose section is equal to that of the passage 1*k* to said valve being integral with a valve-chamber 7, by way of an O-ring 21*a* which is removably engaged in a semi-round groove 7*b* of the valve-chamber.

The main valve 10 is provided with two grooves 10*a* and 10*b* which receive respectively the O-ring 21*a* and another ring 21*b* which is in contact with the seat 1*b* (FIG. 2).

The valve 10 is in abutment against a split rectangular clip 27 which ensures its positioning and which is engaged in a groove of the valve-chamber 7. Said valve-chamber 7 is guided inside a cylindrical part 1*c* of the body by means of blades 7*a* and by a spring 19 resting at one of its ends against the valve-chamber 7 and at its other end against a plunger 3 with the interposition of a cap 26. Said plunger 3 is axially guided by means of lugs 16 integral with the body 1 and engaged in grooves 3*c* of the plunger which is provided with a threaded part 3*a* engaged in a tapped part 2*a* of a control wheel 2 mounted for rotation on the upper part of the body and driving the plunger 3 axially by a nut-and-screw system. Said control wheel 2 is held in position by one or more pins 18 fixed in the said wheel and passing tangentially in a peripheral groove 1*d* of the body, thereby immobilizing the wheel axially, an O-ring 17 being placed between the body and the wheel. The valve-chamber 7 which is hollow, is provided with a female cone defining a seat 7*c* against which rests an O-ring 22 of a one-way valve 8 subjected to the action of a weak conical spring 23 resting against the clip 27. Said wheel 2 is topped by a cylindrical shouldered portion provided with an orifice 2*c* inside which a cylindrical display stud 3*m* slides axially, said stud being integral with the upper part of the plunger 3. Tightness is ensured by an O-ring 15 placed inside a groove of the wheel. The display stud 3*m* thus stands out more or less from the wheel 2 depending on the adjustment of the release spring 19 by the plunger 3, the said stud being entirely retractable inside the said wheel 2. A magnifying glass 11 is plastic material can be optionally mounted on the wheel 2 by means of pins 13 or by glueing, in order to magnify the display stud.

The upper part of the display stud 3*m* is provided with a stack 14 of washers of contrasting colors, visible from a good viewing distance. The thickness of said washers can be 1 mm or any perfectly noticeable thickness at 1.50 m by visual acuity. The thread 2*a* of the wheel 2 is equal to the thickness of a colored washer 14 so that a full or a half-rotation of the wheel permits to move the adjustment of the spring by exactly the thickness of a colored washer 14, the stack of colored washers being held in position by a knob with grooved axle 12 locked in position inside the stud 3*m*.

It is also possible to use a paint, a colored tube or an adhesive tape for the display stud.

The colors of the stack can be selected for example as follows:

(1) to be all different: Red, Green, Black, Yellow, Blue, White;

(2) or: Orange, Black, Orange, Black, Orange, Black;

(3) or: Orange, Nickel-plated, Orange, Nickle-plated, Orange, Nickle-plated.

Other combinations may be used to avoid the risk of errors, and permitting to indicate on the assembly and control chart of the machine on which colored washer the device should be placed.

In this way, all the conditions necessary to adjust without fumbling the gas saving device, whilst the machine is stopped, are fulfilled.

Diagrams indicate the pressure-regulation in relation to the supply pressure and to the selected adjustment (responsiveness of the selected spring and washers 14 of selected colors). The more the stud stands out, the more colored washers are seen and the less the release spring 19 is compressed, and the less the energy saved. If a great number of colored washers are visible, then it is clear that the saving in gas is insufficient and the devices need to be adjusted.

If on the contrary, very few colored washers are visible, it is a sign that gas is being saved.

At the lower part of the device there is provided the flow regulator which comprises a needle-valve 9 (FIGS. 1 and 3) presenting a slim portion 9*c* capable of engaging into a nozzle 10*c* provided in the main valve 10 whose position is stationary during the flow regulating operation. The needle-valve 9 presents a part 9*a* through which it is removably mounted inside a recess 4*b* of an axially sliding rod 4, the said needle-valve being held in position by two pins 24 or by a bridge-shaped clip which, like the said pins, is inset to allow the instant removal of the needle-valve 9. The rod 4 which is axially movable in a bore 1*f* of the body 1 is immobilized in rotation by its square portion 4*d* which moves inside a correspondingly shaped hole 1*m* in the body 1. At its lower part, said rod 4 presents a threaded portion 4*c* which engages a tapped hole provided in milled knob 5 immobilized axially between the body 1 and a sheath 6 fixed on the body by two screws 24 (FIGS. 1 and 4), the milled knob 5 projects to a large extent from the flat part 1*g* of the body and can easily be rotated by hand carrying in its rotation the rod 4 through its threaded part, and ensuring the axial displacement of said rod 4 which is locked in rotation. An O-ring 23 ensures a tight seal between the rod and the bore 1*f*. The needle-valve 9 can thus move so as to leave a maximum passage in the nozzle 10*c* up to a position where it virtually closes off the said nozzle. The characteristic of this arrangement resides in the fact that the needle-valve 9 and the valve 10 are complementary and especially removable, and in that a nozzle section 10*c* is associated to a slightly smaller section of needle-valve. It is therefore easy for the same apparatus to use several nozzles 10*e* of different cross-sections associated to needle-valves of different cross-sections, thus permitting different degrees of responsiveness and in particular, the same apparatus can be used for a whole range of different-sized jacks.

According to another characteristic, means to display the adjustments are used which consist in adjusting the speed of the jack, by using a machine control key on which are indicated the necessary instructions.

On the end of the rod 4 are stacked washers 14 colored for visualizaton, according to the method described hereinabove to control the regulation and saving of the gas. Said washers are held in position by a screw 20 screwed in a tapped hole provided inside the rod 4.

It is thus possible to choose in relation to a display board, the washer which corresponds to the position of the needle-valve 9, the colors of these washers being selected to facilitate the adjustment and also to differ from those used with the gas-saving apparatus, in order to avoid the risk of wrong adjustments.

According to another characteristic, the thread 4*c* is equal to the thickness of a colored washer 14 or equal to a multiple, or to a sub-multiple of the thickness of a washer, so that by causing the milled knob 5 to effect a half rotation, a whole rotation or two rotations, the displacement really corresponds to that of a washer 14. For an easy setting of the rotation of the milled knob 5, said knob comprises a finger-responsive spot 5*a* is milled on said knob (which spot may be of a contrasting color).

It is remarkable that the means for controlling the energy-saving device and the flow regulating device are fundamentally different. This corresponds to a characteristic of the invention which makes it absolutely impossible for the sides to be mistaken, as they are very different. The energy-saving side to be made noticeable is situated towards the tip or on the most accessible side, and it comprises a large wheel, whereas the flow regulator is controlled by a small milled knob.

Captive set screws 25 immobilize the hand-operated control means of the wheel 2 and of the milled knob 5. Indeed, the presence of O-rings prevents the said adjusting members from rotating under the action of vibrations. But, in view of the presence of colored washers, it may happen that inattentive or ill-disposed people act on the adjusting members to change the colored effect.

In this eventually, the sheath 6 is provided with a tapped hole in which is screwed a captive set screw 25 which is adapted to come into contact with the surface of the milled knob 5 (FIG. 4).

In the same way (FIG. 10), a captive set screw 25 is engaged in a tapped hole of a boss provided on the body 1, said screw being adapted to come into abutment against the edge of the wheel 2 to lock it in a predetermined position.

It is also possible to make perforations in the wheel 2 and in the milled knob 5, in order to engage therein a sealing wire to immobilize the wheel and the milled knob when the adjustment is not to be changed. Adequate perforations may also be provided on the lower part of the wheel, on the body and on the milled knob to allow the fitting of padlocks securing the adjustments.

FIG. 11 shows an installation where a regulating device according to the invention is fitted, which device corresponds to that shown in FIG. 6 but the operation of which corresponds to that described hereinabove and shown in FIG. 1.

The regulating device is mounted on the supply and exhaust pipe on the return side R of the jack V.

During the gas supply along arrow a the piston p of the jack V effects his return stroke R at low pressure and with a weak effort of the piston p. During this supply phase a the energy-saving pressure-regulator is actuated; in moving from A towards B, the gas lifts the main valve 10 from its seat 1*b* against the action of the spring 19 (FIG. 1), so that there occurs an expansion of the gas by lamination which arrives in B at a regulated pressure to supply the jack V on its return phase R. The pressure is controlled by adjusting the tension of the spring 19 by means of the wheel 2 and of the plunger 3. In this case, the valve 8 remains in the closing off position and acts as a one-way valve. The jack is supplied with a gas whose pressure is 2 to 4 times weaker than the working pressure 6, thereby creating important savings in gas and energy.

Besides the adjustment by means of the wheel 2 it is also possible to replace the spring 19 with another. In this way, springs of different degrees of responsiveness or of different tensions can be used. The degrees of responsiveness and the range of springs are materialized by a plastic cap 26 colored differently depending on the responsiveness according to a mnemo-technic code.

When the jack V works according to arrow T at normal pressure, it pushes the gas away in the other direction according to arrow e, i.e. in the device from B towards A.

In this case, the main valve 10 remains in the closing off position and the secondary valve 8 occupies, under the action of the gas, as opening position allowing the flow of gas through the nozzle 10*c* towards A. The valve 10 being on its seat 1*b*, the nozzle 10*c* as a result keeps in the same position with respect to the needle valve 9.

To adjust the speed of the gas through the nozzle 10, it is necessary to displace the needle-valve 9 to a greater or lesser extent by acting on the milled knob 5 which drives the rod 4 and the needle valve 9 inside the nozzle 10*c* whose cross-section is more or less closed by the needle-valve 9.

The flow can be regulated either by acting on the milled knob 5 or by replacing the valve 10 by another with a nozzle of different cross-section. The cross-section of the nozzle 10*c* may be associated to needle-valves 9 of different cross-sections, since the valve and the needle-valve are removably mounted. By adjusting the flow with the device as indicated above, the forward motion and the speed of the piston p of the jack is regulated.

FIGS. 6, 7 and 8 illustrate another embodiment of the regulating device in which the main valve 36 is flat and made from an elastomer or from a plastomer. The said valve is provided with a hole inside which is engaged a flow regulating valve 44, resting against the split rectangular clip 27. This embodiment comprises no wheel, but instead a milled knob 32 for controlling the saving in gas and energy, the said knob being mounted inside a threaded plug 31 with interposition of a locking element 37 and is held axially in position by means of pins 38 secured in the knob and passing tangentially in the groove 32*b* of the milled knob 32. The threaded plug 31 is screwed at its lower part on the body 30 by way of a thread 31*d*. The milled knob 32 is provided with a tapped hole 32*a* inside which is engaged a threaded part 34*a* of a rod 34 mounted for sliding in a bore 31*c* of the plug 31 with interposition of a seal 15. The end of the rod 34 is square and is integral with a plate 40 via a screw 41, the said plate presenting studs engaged in grooves 31*e* of the threaded plug, so that the plate and the rod 34 are locked in rotation.

The driving of the milled knob 32 in rotation, ensures via the threaded part 34*a* of the rod 34 the axial displacement of the latter which is locked in rotation, so that the spring 19 which is in resting contact on the plate 40, is compressed and released.

The upper end of the rod 34 is provided with washers 14 as in FIG. 1, and shows all the characteristics and advantages described hereinabove. A captive screw 25 engaged in the milled knob 32 allows the locking of the milled knob as described hereinabove.

The flow regulating means has no milled knob, but the rod is provided with a threaded part 33*c* which is engaged in a correspondingly tapped hole in the body 30. The rod 33 moves in rotation and in translation and carries at its upper end the needle-valve 9.

Said needle-valve 9 (FIG. 8) comprises a large cross-section 9*d* which works in combination with a nozzle 44*c*, of large cross-secton in the flow valve 44 (FIG. 7). The needle valve 9 and the flow valve 44 are removable and paired by degree of responsiveness.

The rod 33 is controlled by way of a housing 33*d* which is hexagonal and wherein a male key of corresponding shape is engaged. An O-ring 33*a* ensures the tightness and a safely secured screw 25 locks the flow regulating rod 33 whilst preventing its accidental dismantling.

The screw 25 is engaged in a tapped hole 30*m* provided in the body.

The lower end of the rod 33 forming a display stud is provided with colored washers 14, held by an elastic ring 43, said stud being used as described hereinabove.

The locking screw 25 is used as a rotation reference mark, to determine the number of rotations of the milled knob 32. The key engaged in the housing 33*d* is also used as a rotation reference mark, to determine the number of rotations of the rod 33 of the flow regulating device. FIG. 9 shows a spring which is complete with a colored cap 35 and markings 45*a*, which constitute with different colors and differently marked caps, mnemotechnic means of detecting the different springs which can be mounted in the same device or apparatus in order to obtain different degrees of pressure-regulating responsiveness. In this case, the cap is dismountable and disposable after use. According to another signalling method of the spring (FIG. 6) the colored washer 42 remains fixed on the spring, in the same way as shown in FIG. 1.

The field of application where gas and energy economies are sought is that of jacks working with gases, the return phase of which, where no work is achieved, can be effected with a pressure which is two to four times smaller than the working pressure. Thus, any types of machines using jacks, and in particular compressed air jacks, are interested in the device according to the invention: packing machines, bottling machines, handling jacks, shoving apparatus, pharmaceutical laboratories and all compressed air cyclic control systems.

The advantage of the device according to the invention is that it can be fitted on an existing pipe on the return phase of the jack. It therefore suffices to sever the pipe and to insert therein the device according to the invention, to obtain instantly important savings in energy.

Various modifications may of course be made to the invention described hereinabove by an one skilled in the art without for all that departing from its scope or its spirit.

What is claimed is:

1. Energy saving improvement to a device for regulating the flow and pressure of compressed gases, said device being installed in a conduit connecting the outlet of a control valve to a pressure-using apparatus to regulate the pressure toward the pressure-using apparatus and the flow in the reverse direction, wherein said device comprises a main body having aligned inlet and outlet nozzles, said body having a main valve seat connected to said inlet nozzle, a valve chamber member, a main valve carried by said valve chamber member at one end thereof for movement therewith, first resilient means for urging said main valve into engagement with said main valve seat, first manually operable means for adjusting the force exerted by said first resilient means, said first manually operable means comprising visible indicator means extending in a variable manner externally of said first manually operable means, said main valve ensuring a reduction of the gas pressure in the direction of the pressure-user apparatus, said valve chamber comprising at the other end thereof a secondary valve and second one-way acting resilient means for urging said secondary valve closed, said second resilient means being relatively weak so that when the main valve is closed the secondary valve is adapted to occupy an open position for the passage of gas flowing in from the pressure-user apparatus, a nozzle formed in the main valve, a needle valve cooperating with said main valve nozzle for controlling the flow of said gas flowing in from the pressure-user apparatus, and second manually operable means for adjusting the position of said needle valve, said second manually operable means comprising second visible indicator means extending in a variable manner externally of said second manually operable means, each of said visible indicator means comprising markings corresponding to the position of the member moved by the associated manually operable means and to the value of the flow and pressure regulated thereby.

2. Improvement as in claim 1, wherein the main valve comprises two O-rings situated in two external grooves of the valve, one of the rings resting on the main valve seat, whilst the other secures the main valve in a groove of the valve chamber.

3. Improvement as in claim 1, wherein the nozzle of the main valve is always in the same position with respect to the main seat.

4. Improvement as in claim 1, wherein first manually operable means is constituted by a milled knob mounted for rotation inside a threaded plug, the said knob comprising a tapped hole inside which is engaged a screw which screw is movable axially and is provided at one of its ends with a washer locked in rotation, against which the spring of the main valve is in resting contact, said screw comprising at its other end a visualization stud.

5. Improvement as in claim 1, wherein the second manually operable means for regulating the flow is constituted by a screw engaged in a tapped hole provided in the body and comprising at one of its ends a visualization stud, and at its other end, a recess inside which is fitted needle needle-valve the said screw being provided at its end which extends outside the body with a hexagonal recess situated inside the visualization stud and which is adapted to receive a correspondingly shaped tool.

6. Improvement as in claim 5, wherein the screw controlling the regulation of the flow is locked in rotation by a captive set screw engaged in a groove deep enough to limit the axial stroke of the said screw controlling the regulation of the flow and which abuts against the captive set screw.

7. Improvement as in claim 1, wherein the first resilient means are provided with a plug, with a colored washer, or with a colored cap, bearing reference markings which indicate the responsiveness and the predetermined range of pressure regulation.

8. The improvement as in claim 1 in which said valve chamber member is axially movable under the influence of said main valve resilient means, said secondary valve being disposed within said chamber member, an interior groove in the wall of said chamber member, a clip in said groove, said second resilient means comprising a spring between said clip and said secondary valve, a second interior groove in the interior wall of said chamber member, an O-ring in said second groove, said main valve and said O-ring being force-fitted in said chamber member in contact with the face of said clip remote from said second spring.

9. An improvement as in claim 1 in which said main valve reduces the gas pressure in the direction of the pressure-user apparatus in accordance with the force exerted by the first resilient means.

10. An improvement as in claim 1 in which said main valve acts as a non-return closing off means for gases flowing from the pressure-user apparatus when the main valve is in engagement with the main valve seat.

11. An improvement as in claim 1 in which said needle valve has a maximum cross-section which is smaller than said main valve nozzle.

12. An improvement as in claim 1 including a plurality of interchangeable nozzles of different sizes and needle valves of different cross-sections selectively associated for obtaining ranges of different flow rates and apparatus having different degrees of responsiveness.

13. An improvement as in claim 1 including a plunger disposed in said body and locked against rotation relative thereto, said first resilient means bearing against said plunger, said first manually operable means comprising threaded means including an operating wheel rotatable on said body, said first visible indicator means comprising a visualization stud on said plunger, said stud extending through said wheel in fluid tight relationship.

14. Improvement as in claim 13 wherein the wheel controlling the energy-saving pressure regulator is adapted to be locked in position by means of a captive safety screw engaged in a tapped hole of a boss provided on the body, said screw presenting a sharp end engaged in a corresponding recess of the wheel.

15. An improvement as in claim 13 including a boss on the inside of said body on the side opposite said operating wheel, a rod slidably mounted within said boss in fluid tight relationship therewith, said needle valve being carried by said rod, said rod having a threaded portion, an internally threaded milled knob carried by said threaded portion, a sheath secured to said body, said knob being disposed between said boss and said sheath so as to be held against axial movement relative to said housing, means restraining said rod against rotation relative to said body, said second visible indicator means comprising a second visualization stud on said rod extending out of said sheath.

16. Improvement as in claim 15 wherein the milled knob for controlling the regulating of the flow is adapted to be locked in position by means of a screw mounted in the sheath and whose pointed end is engaged into the material of the stud milled knob, the said safety screw being held captive and preventing the adjustments from going out of order.

17. Improvement as in claim 15, wherein the hand-operated wheel controlling the pressure regulation, and the milled knob for regulating the flow are provided with holes inside which is engaged a sealing wire.

18. Improvement as in claim 15, wherein the hand-operated wheel for controlling the pressure regulation and the milled knob for regulating the flow are provided with holes inside which is engaged a padlock interlocking the said wheel and the said milled knob with the body in order to prevent the adjustment from going out of order.

19. Improvement as in claim 18, wherein the milled knob is provided with a tapped hole inside which engages a captive safety screw, whose pointed end is adapted to engage the material of a lock washer.

20. Improvement as in claim 19, wherein the main pressure regulating valve is provided with a single external groove in which is placed a flat seal in elastic or plastic material, adapted to come in resting contact on the main flat seat.

21. An improvement as in claim 1 in which each of said manually operable means comprises a screw element, each of said visible indicator means comprising parallel strips which are so related to the pitch of the corresponding screw element that a predetermined rotation of the element corresponds to an axial movement thereof equal to the width of a strip, each of said manually operable means being provided with an index for indicating the rotation of the corresponding element.

22. An improvement as in claim 1 in which said first manually operable means comprises an operating wheel, said first visible indicator means comprising stacked washers of colors contrasting with the color of the wheel.

23. An improvement as in claim 1 in which said first manually operable means comprises a wheel, said first visible indicator means comprising a tube carrying parallel reference marks contrasting in color with said wheel.

24. An improvement as in claim 1 in which said first visible indicator means comprises a stud and an adhesive strip wound on the stud.

25. An improvement as in claim 1 including a magnifier associated with said first visible indicator means.

* * * * *